(12) United States Patent
Jones

(10) Patent No.: US 7,581,770 B2
(45) Date of Patent: Sep. 1, 2009

(54) CAN HANDLE

(76) Inventor: Henry James Jones, 46232 North Street, Sparta, Ontario (CA) N0L 2H0

( * ) Notice: Subject to any disclaimer, the term of this patent is extended or adjusted under 35 U.S.C. 154(b) by 48 days.

(21) Appl. No.: 11/810,430

(22) Filed: Jun. 5, 2007

(65) Prior Publication Data

US 2008/0303298 A1 Dec. 11, 2008

(51) Int. Cl.
*B65D 25/28* (2006.01)
*A47J 45/00* (2006.01)

(52) U.S. Cl. .................. 294/31.2; 294/148; 220/758

(58) Field of Classification Search .............. 294/31.2, 294/119.2, 148, 150; 215/396; 220/758, 220/759
See application file for complete search history.

(56) References Cited

U.S. PATENT DOCUMENTS

| | | | | |
|---|---|---|---|---|
| 864,103 A * | 8/1907 | Mulroyan | .................. | 81/3.43 |
| 1,351,772 A * | 9/1920 | Libbey | .................. | 24/483 |
| 1,681,197 A * | 8/1928 | Rueff | .................. | 220/710.5 |
| 2,275,875 A | 3/1942 | Werfel | | |
| 2,305,492 A | 12/1942 | Polglein | | |
| 2,361,417 A | 10/1944 | Reichart | | |
| 2,378,867 A | 6/1945 | Reichart | | |
| 2,540,860 A * | 2/1951 | Blomquist | .................. | 294/31.2 |
| 2,740,655 A * | 4/1956 | Maly | .................. | 294/31.2 |
| 2,839,323 A * | 6/1958 | Jamieson | .................. | 294/31.2 |
| 2,886,366 A * | 5/1959 | White | .................. | 294/31.2 |
| 2,967,071 A * | 1/1961 | Deschene | .................. | 294/31.2 |
| 2,982,577 A * | 5/1961 | Serio | .................. | 294/31.2 |
| 3,114,484 A | 12/1963 | Serio | | |
| 3,463,536 A * | 8/1969 | Beyer et al. | .................. | 294/31.2 |
| 3,709,544 A * | 1/1973 | Oltmanns | .................. | 294/31.2 |
| 3,807,679 A * | 4/1974 | Burke et al. | .................. | 248/690 |
| 3,821,832 A | 7/1974 | Smith | | |
| 4,866,813 A | 9/1989 | Dupont | | |
| 5,662,446 A | 9/1997 | Haan | | |
| 6,260,732 B1 | 7/2001 | Khodush | | |
| 6,588,064 B2 | 7/2003 | Baum | | |
| 6,979,031 B2 | 12/2005 | Coppotelli et al. | | |
| 2006/0090300 A1 | 5/2006 | Kim | | |
| 2006/0131835 A1 | 6/2006 | Simpson | | |

FOREIGN PATENT DOCUMENTS

CH    676191 A5    12/1990

OTHER PUBLICATIONS

Ruby Lane, Eche's Ketches , Collectibles, Luzianne 3-Pound Coffee & Chicory~ 1928 Red Can w/Original Lid & Handle, (www.rubylane.com) downloaded May 11, 2007.

* cited by examiner

*Primary Examiner*—Dean J Kramer
(74) *Attorney, Agent, or Firm*—Christopher John Rudy

(57) ABSTRACT

Handle for an object includes a member for grasping with the hand, and a strap attachable to the member for embracing and securing the object. The strap includes a band portion having a tension buffer segment, and a band lock. The handle can be found in combination with the object, which, for example, may be a large metal coffee can.

22 Claims, 3 Drawing Sheets

CAN HANDLE

FIELD AND PURVIEW OF THE INVENTION

Figure 1:
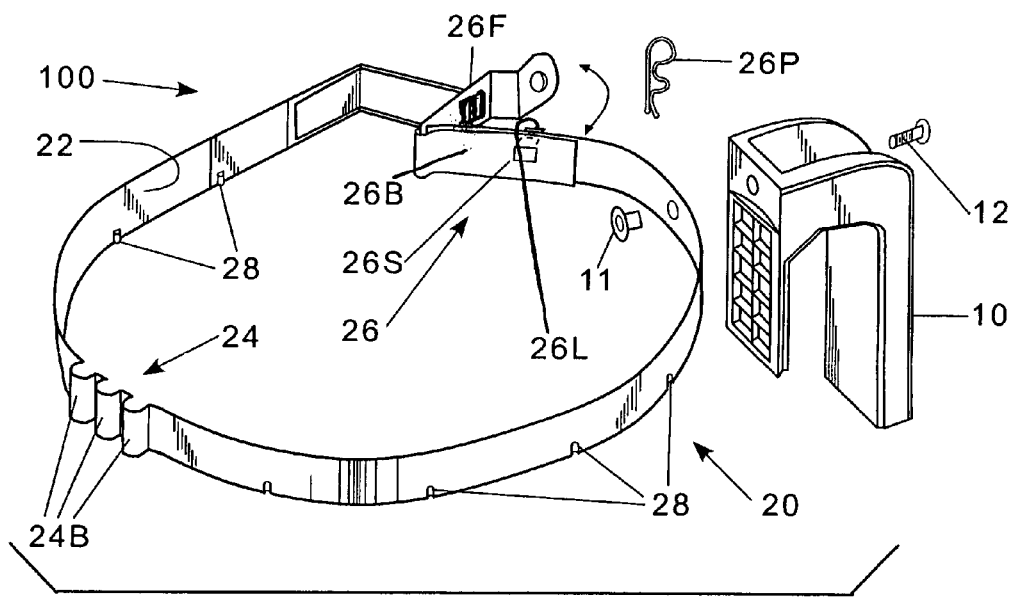

This concerns a handle for an object. The handle includes a member for grasping with the hand, and a strap for embracing and securing the object, which can be a can, for example, a large coffee can. It can concern the handle with the object.

BACKGROUND TO THE INVENTION

The manipulation of metal cans, especially, for example, large metal cans such as large coffee cans, can be problematic. Such cans often need two hands to grasp and control, especially for those with smaller hands, and they are subject to dropping and spilling. In addition to and in view of such difficulties, which themselves are notable, the homemaker often settles for putting such a large can, especially when opened, in a position convenient for grasping and retrieving but perhaps not so convenient or efficient with respect to storage.

Various art is known that attempts to address manipulation of cylindrical or other objects by handles. See, e.g., U.S. Pat. Nos. 2,275,875; 2,305,492; 2,361,417; 2,378,867; 2,839,323; 3,114,484; 3,821,832; 4,866,813; 5,662,446; 6,260,732; 6,588,064 and 6,979,031. See also, U.S. patent application publication Nos. 2006/0090300 A1 and 2006/0131835 A1. Compare, Swiss patent document No. CH 676191 A5; and a 1928 can with handle for Luzianne 3-pound coffee and chicory from Ruby Lane, Eche's Ketches, Collectibles. Drawbacks with such art can include a plural number of certain component parts, some of which protrude and have surfaces that can tear the skin such as rivets, including in the strap that is to go around the object; a certain difficulty in securing the strap, especially for the homemaker or young or old person; and a certain unadaptability for the large coffee can, where, if the known device were used in an attempt to be combined with the can, among other things, slippage and so forth can occur, or the can may be crushed or even split open, thus endangering its contents.

It would be desirable to ameliorate if not completely solve problems in the art. It would be desirable to provide an alternative to the art. It would be particularly desirable to address problems in and provide an alternative to the art with respect to the large coffee can.

A FULL DISCLOSURE OF THE INVENTION

In general, the invention provides a handle for an object, which comprises a member for grasping with the hand, and a strap attachable to said member for embracing and securing the object, wherein the strap includes a band portion having a tension buffer segment, and a band lock. The handle can be found in combination with the object.

The invention is useful in stowage and retrieval.

Significantly, by the invention, the art is advanced in kind, with a viable alternative provided and one or more problems in the art ameliorated if not completely solved. The handle is especially useful for and in combination with a metal can, for example, a large coffee can. The band portion of the strap can be provided as one piece, including the band lock, with, however, its latch able to be provided as an additional, simple pin, thus simplifying construction. Such outwardly protruding features as external rivets on the strap can be avoided. The tension buffer can permit the handle with its strap to firmly yet easily hold the object, particularly in the form of the large coffee can. In addition, inside protuberances can be provided in the band to position the strap vertically in a groove found in standard large metal coffee cans, or otherwise to grip a smooth surface. The homemaker, the young and the elderly are able to install and lock the handle readily, and its secure embrace of the object permits ease of handling the object and any of its contents, thus opening up more flexibility in storage. Also, the can handle can be aesthetically pleasing.

Numerous further advantages attend the invention.

Figure 2:
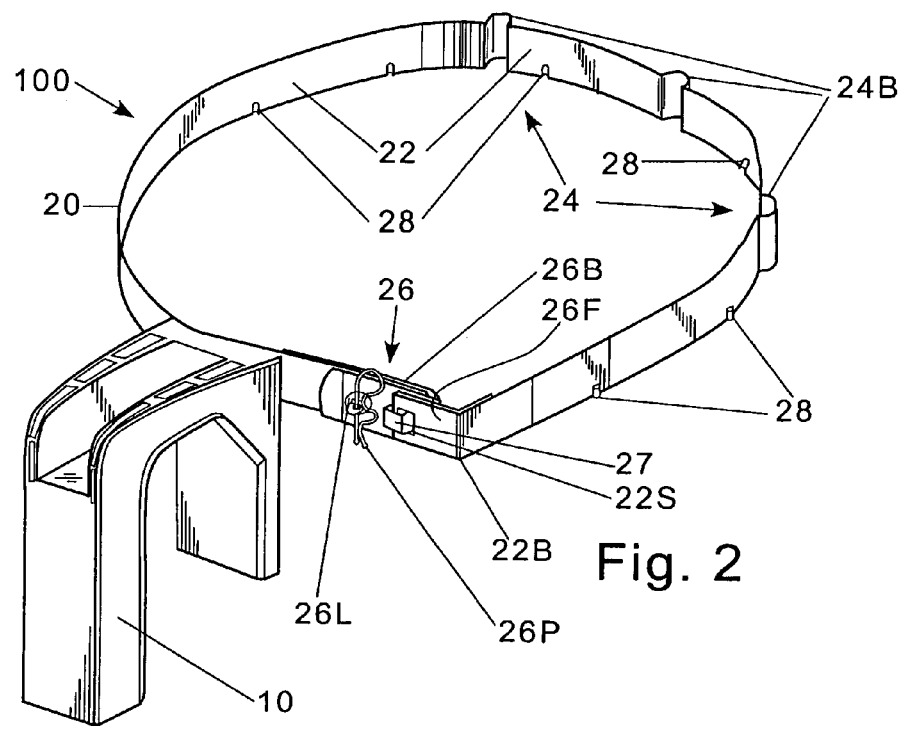
Figure 3:
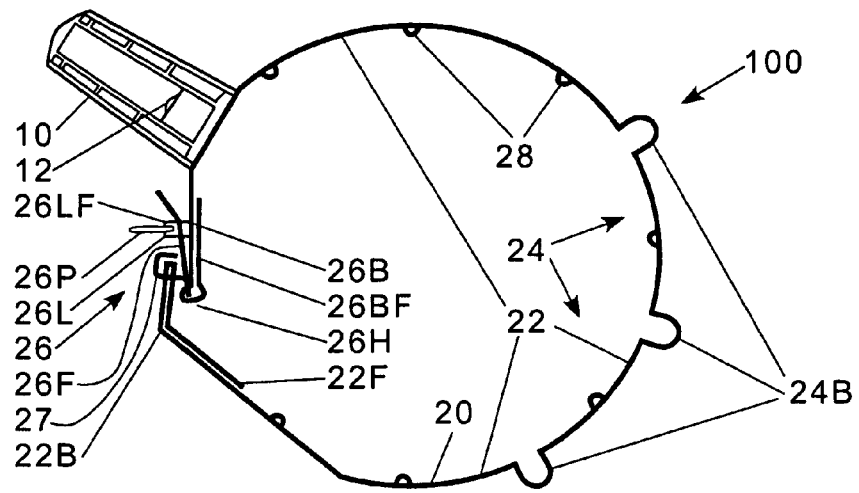
Figure 4:
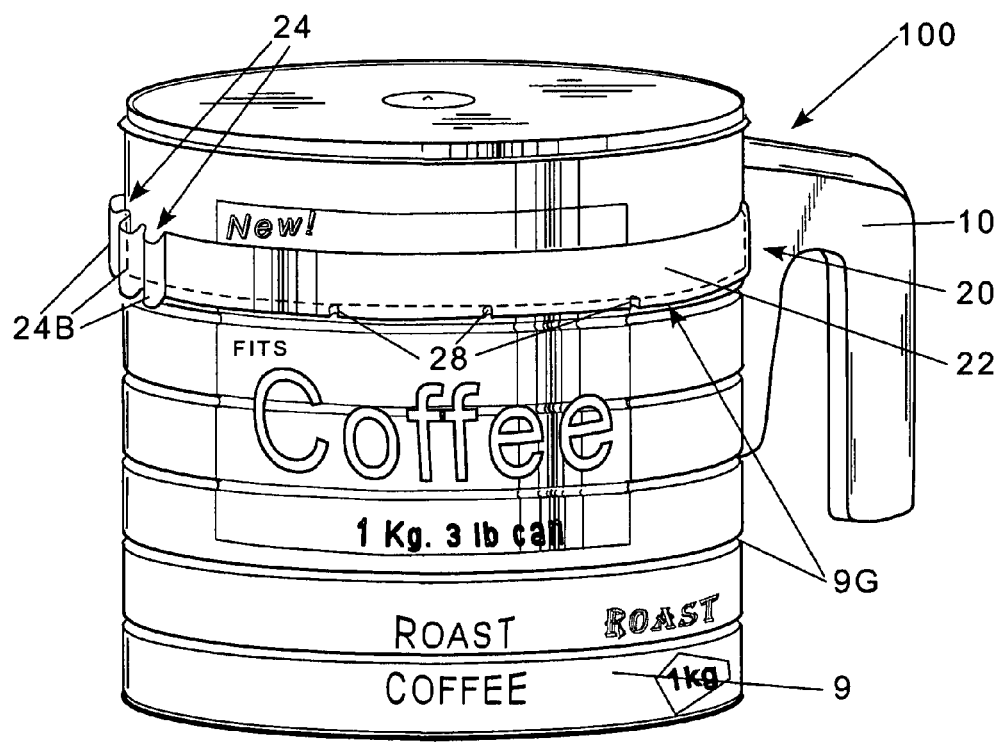
Figure 5:
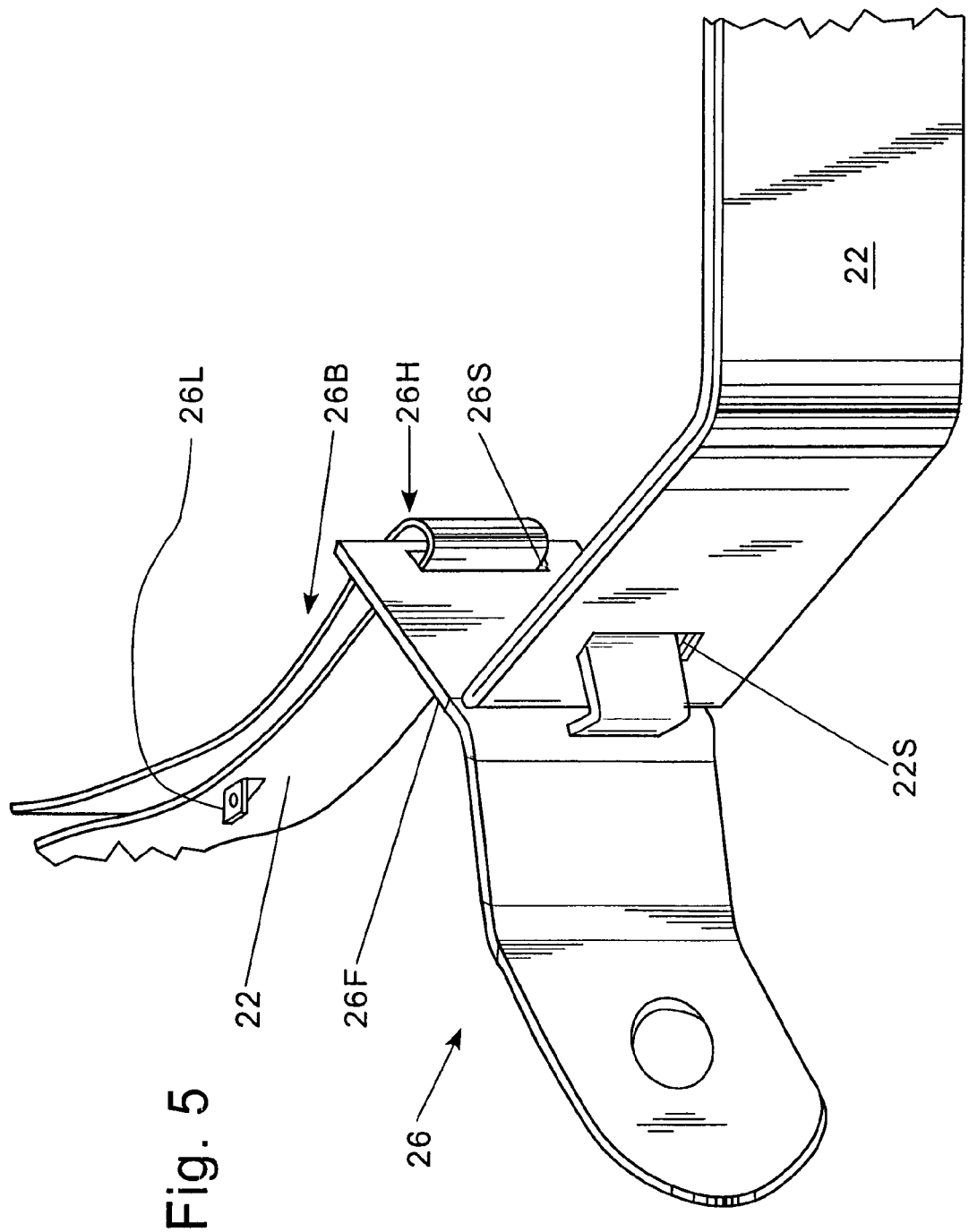

The drawings form part of the specification hereof. With respect to the drawings, which are not necessarily drawn to scale, the following is briefly noted:

FIG. 1 is a perspective, exploded view of a handle hereof.
FIG. 2 is a perspective view of a handle as of FIG. 1, but with a more spread out tension buffer segment, assembled.
FIG. 3 is a top view of the handle of FIG. 2.
FIG. 4 is a side view of the handle of FIGS. 1-3 embracing and locked onto a large metal coffee can.
FIG. 5 is a perspective view of the locking mechanism.

The invention can be further understood by the detail set forth below, which may be read in view of the drawings. As with the foregoing, it is to be taken in an illustrative and not necessarily limiting sense.

Any suitable material(s) can be employed to make the present handle. For instance, the member for grasping with the hand can be made of a solid generally inert material such as metal, wood or a suitable plastic, for example, polypropylene. The band member of the strap can be made of any suitable strong material having some spring-like qualities such as a relatively inert metal, to include steel and so forth, for example, stainless steel. Thus, the tension buffer segment can effectively operate, and a lock snap segment if provided of one piece with the remaining part of the band can efficiently operate as well, with other feature(s) of the band such as the inside protuberances can be provided in the band to position the strap vertically can be provided, all while the band securely embraces the object and the strap and handle permit its easy manipulation.

With reference to the drawings, handle 100 for embracing and securing object 9, for example, a large metal can made to hold a 1-kg or 3-lb. quantity of coffee, includes member 10 for grasping with the hand, and strap 20. The strap 20 can be attached to the member 10 by inner nut 11 and bolt 12 or other fastener such as screw(s), rivet(s), clip(s) and/or glue, and secure the object 9.

The strap 20 includes band portion 22, for example, of about ¾-inch high approximately 20-gauge thick stainless steel, which may have first inner facing back fold 22F held with a spot weld, and vertically oriented slot 22S at a first end, and has tension buffer segment 24, made, for example, of bend(s) 24B in the band portion 22. More deeply bent or more numerous bends 24B can make for more flexibility in the strap 20. Over the center band lock 26 can include base 26B, which may be considered to be an extension of the band portion 22 or its second end, which may have second inner facing back fold 26BF held with a spot weld to be folded to wrap through slot 26S to attach fold segment 26F; hook 27 and flap-receiving hole 26FH in the fold segment 26F; hinge 26H; and latch 26L, which can be can be provided as an outwardly extending flap 26LF cut out and folded upward from the base 26B and having hole 26LH in it, with such a flap 26LF able to be inserted through the hole 26FH in the fold segment 26F for insertion of the latch 26L, with securing of the lock 26 accomplished by insertion of pin 26P. The band portion 22 can have predetermined angle 22A, for example, 45-50 degrees, in bend 22B. Folding the band lock 26 into a position, where it can be secured with the latch 26L and pin 26P, tightens the band portion 22 of the strap 20 about the object 9, with appropriate "give" provided by the tension buffer segment 24. Protuberance(s) 28 can be provided inside in the band portion 22 to position the strap 20 vertically in a groove 9G such as found in standard large metal coffee cans, or otherwise to grip a smooth surface.

CONCLUSION TO THE INVENTION

The present invention is thus provided. Various feature(s), part(s), subcombination(s) and/or combination(s) can be employed with or without reference to other feature(s), part (s), subcombination(s) and/or combination(s) in the practice of the invention, and numerous adaptations and modifications can be effected within its spirit, the literal claim scope of which is particularly pointed out by the following claims:

What is claimed is:

1. A handle for an object, which comprises a member for grasping with the hand, and a strap, which can be closed and released, and which is attachable to said member for embracing and securing the object, wherein the strap includes a band portion of one and only one piece having first and second ends and having a tension buffer segment integral with and part of the band portion between the first and second ends, and a folding, over center band lock, wherein:
   the object has a vertical axis; and
   the over center band lock swings in a radial motion and laterally with respect to the vertical axis of the object and is made to include and operate with the first and second ends of the band portion plus a fold segment of one and only one piece that pivotally connects the first and second ends of the band portion, wherein, integrally and intrinsically with the band portion and fold segment themselves there are provided:
      first means for pivotally connecting the first end of the band portion with the fold segment; and
      second means for pivotally connecting the second end of the band portion with the fold segment, which is spaced apart from said first means.

2. The handle of claim 1, wherein the tension buffer segment includes at least one bend in the band portion of the strap.

3. The handle of claim 2, wherein at least one inside protuberance is provided in the band portion of the strap.

4. The handle of claim 3, wherein the object is a large metal coffee can.

5. The handle of claim 2, wherein the object is a large metal coffee can.

6. The handle of claim 1, wherein the band portion includes, integrally and intrinsically therewith, an outwardly, laterally protruding angled bend when the strap is released.

7. The handle of claim 6, wherein there is further provided a means for securing the over center band lock in position when the strap is closed.

8. The handle of claim 7, wherein the object is a large metal coffee can.

9. The handle of claim 6, wherein the object is a large metal coffee can.

10. The handle of claim 1, wherein the object is a large metal coffee can.

11. In combination, the handle of claim 1 and the object.

12. The combination of claim 11, wherein the object is a large metal coffee can.

13. A handle for an object, which comprises a member with a first projection for grasping with the hand and a second projection spaced apart from the first projection for contacting an outside surface of the object, and a strap, which can be closed and released, attached to said member for surrounding and securing the object, wherein said first projection of said member extends laterally from the strap and then down, and said second projection of said member is adapted to be closer relative the object than the first projection of said member and extends down; and the strap includes both a band portion of one and only one piece having first and second ends, having a first bend, which is an outwardly, laterally protruding angled bend when the strap is released, and having a tension buffer segment integral with and part of the band portion between the first and second ends and including at least one second bend; and a folding, over center band lock, which remain with or attached to the band portion of the strap when the strap is released, wherein:
   the object has a vertical axis; and
   the over center band lock swings in a radial motion and laterally with respect to the vertical axis of the object and is made to include and operate with the first and second ends of the band portion plus a fold segment of one and only one piece that pivotally connects the first and second ends of the band portion, wherein, integrally and intrinsically with the band portion and fold segment themselves there are provided:
      first means for pivotally connecting the first end of the band portion with the fold segment; and
      second means for pivotally connecting the second end of the band portion with the fold segment, which is spaced apart from said first means.

14. The handle of claim 13, wherein, in the band portion of the strap, at least one inside protuberance is also provided; there is further provided a means for securing the over center band lock in position when the strap is closed; and the object is a large metal coffee can.

15. A handle for an object, which comprises a member for grasping with the hand, and a strap attached to said member for surrounding and securing the object, wherein:
   said member extends laterally from the strap and then down; and the strap includes both a band portion having a tension buffer segment and a band lock, both of which remain with or attached to the band portion of the strap when the strap is released;
   in the band portion of the strap, the tension buffer segment includes at least one bend, and at least one inside protuberance is provided; and the band lock is an over center band lock having a folding segment having first and second ends, which segment pivots laterally with respect to the band portion of the strap; and
   the band portion, excluding the tension buffer segment and the at least one inside protuberance, is substantially flat, oriented vertically with respect to the object, is made of one piece, and further includes first and second ends, each of which is formed from folded band material that is folded inside with respect to the band portion, and wherein:
      the bend in and near the first end of the band portion projects laterally outward and includes inside folded band material spanning the bend;
      the first end of the band portion pivotally links with the folding segment of the band lock at a position between the first and second ends of the folding segment; and
      the second end of the band portion pivotally links with the folding segment of the band lock about the second end of the folding segment.

16. The handle of claim 15, wherein:
   a flap with a hole projects laterally outward from near the second end of the band portion;

the folding segment of the band lock has a hole near its second end through which the flap can pass when the band lock is closed; and a pin is provided for passing through the hole of the flap to keep the band lock from releasing when the strap is secured against the object.

17. The handle of claim 16, wherein the strap is made of metal.

18. The handle of claim 15, wherein the strap is made of metal.

19. In combination, the handle of claim 15 and the object.

20. The combination of claim 19, wherein the object is a large metal coffee can.

21. A handle for an object, which comprises a member for grasping with the hand, and a strap, which can be closed and released, and which is attachable to said member for embracing and securing the object, wherein the strap includes a band portion of one and only one piece of metal having first and second ends and having a tension buffer segment integral with and part of the band portion between the first and second ends, and a folding, over center band lock, wherein the object has a vertical axis, and the over center band lock swings in a radial motion and laterally with respect to the vertical axis of the object and is made to include and operate with the first and second ends of the band portion plus a fold segment that connects the first and second ends of the band portion, with:

the first end of the band portion:

having a first back fold in the band portion so that first end band portion material extends back along the band portion and is welded thereto;

being made to form an outwardly, laterally protruding angled bend in the band portion and its first end band portion material extending back along the band portion from the first back fold when the strap is opened, and having a first slot near an extremity of the first end of the band portion between said bend and where the back fold is made;

the second end of the band portion:

having a second back fold in the band portion so that second end band portion material extends back along the band portion and is welded thereto; and having a loop formed by the extremity of the second end of the band portion;

the fold segment:

being of one and only one piece;

including a hook that passes through and resides in the first slot of the first end of the band portion so that the first end of the band portion is pivotally engaged thereby; and having a slot spaced apart from the hook and near an extremity of the fold segment, through which the second back fold of in the band portion passes and in which resides the loop formed by the extremity of the second end of the band portion so that the second end of the band portion is pivotally engaged thereby.

22. The handle of claim 21, wherein there is a laterally, outwardly extending flap with a hole provided from the metal of the band portion about its second end; there is a hole through the fold segment, through which the flap and the hole in the flap can extend when the strap is closed; and there is provided a pin for inserting through the hole in the flap when the strap is closed to secure the strap and handle closed.

* * * * *

UNITED STATES PATENT AND TRADEMARK OFFICE
CERTIFICATE OF CORRECTION

| | | |
|---|---|---|
| PATENT NO. | : 7,581,770 B2 | Page 1 of 1 |
| APPLICATION NO. | : 11/810430 | |
| DATED | : September 1, 2009 | |
| INVENTOR(S) | : Henry James Jones | |

It is certified that error appears in the above-identified patent and that said Letters Patent is hereby corrected as shown below:

Title Page;

On the front page, item No. 56, OTHER PUBLICATIONS, add:

Meijer, local newspaper advertising insert, third page, with Folger's plastic coffee container with built-in grasping feature depicted, September 30, 2007 A.D.

Meijer, local newspaper advertising insert, first page, with Maxwell House plastic coffee container with built-in grasping feature depicted, September 15, 2007 A.D.

Signed and Sealed this
Fourteenth Day of June, 2011

David J. Kappos
*Director of the United States Patent and Trademark Office*